Jan. 19, 1965   R. W. GUNDLACH   3,166,432
IMAGE DEVELOPMENT
Filed May 7, 1959
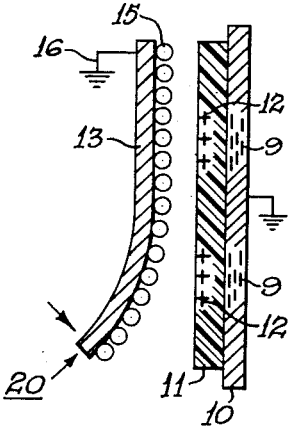
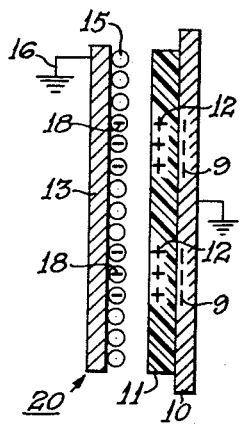
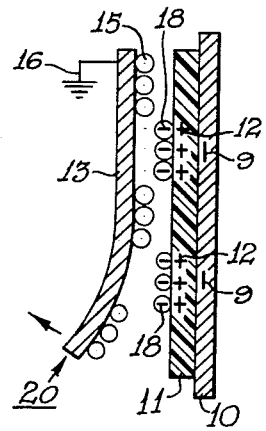
Fig. 1A    Fig. 1B    Fig. 1C
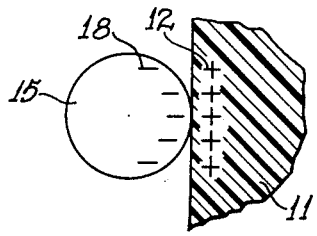
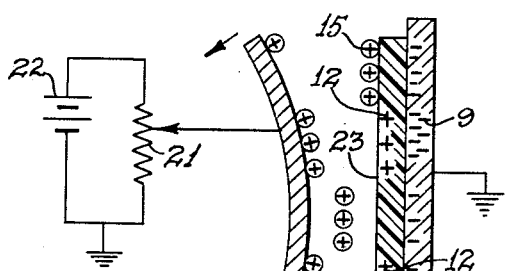
Fig. 1D                Fig. 2
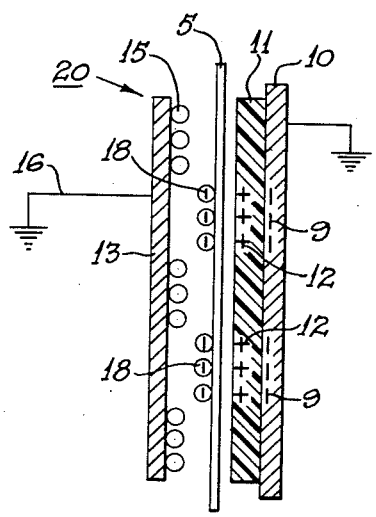
Fig. 3
INVENTOR.
Robert W. Gundlach
BY Stanley Z. Cole
ATTORNEY 3,166,432
IMAGE DEVELOPMENT
Robert W. Gundlach, Spencerport, N.Y., assignor to Xerox Corporation, a corporation of New York
Filed May 7, 1959, Ser. No. 811,609
11 Claims. (Cl. 117—17.5)

This invention relates in general to development of electrostatic charge patterns and in particular to image development in the art of xerography.

Various techniques exist to form electrostatic charge patterns on members adapted to retain the charge pattern for image development or for other forms of utilization. Thus, and for example, in McNaney U.S. Patent 2,777,745 a charge pattern in image configuration is formed on an insulating layer as controlled by imaging techniques in connection with a cathode ray tube. Also in xerography, as is well known in the art, it is usual to form an electrostatic image pattern of electrostatic charge on an insulating or photoconductive insulating surface conforming to information to be recorded or reproduced through the application of a light or radiant energy image to discharge a sensitive photoconductive insulating layer or through other manipulations based on various electrical phenomena. Other techniques exist to form a developable charge pattern.

To visualize a formed charge pattern, and particularly when doing so in the art of xerography, it is usual to apply finely divided insulating materials, generally powders, to the charge pattern bearing surface. Thus commercially the electric image is generally developed by cascading across the image surface a mixture of relatively large beads or granular material carrying on their surfaces finely divided pigmented insulating dust particles. The dust particles during development separate from the beads and are drawn to the image charge on the image bearing surface and thus there results, after cascading the mixture across the image bearing surface, a developed and visually apparent image conforming to the original information being recorded or reproduced. Alternatively, charge patterns have been developed using insulating or conductive dust or liquid ink by presenting the developer in an air suspension to the charge pattern bearing surface. As in the case of the cascading mixture, droplets or dust particles are drown to the charge on the surface being developed resulting in a developed, generally visible image conforming to the original information being recorded or reproduced. Other development techniques include the use of insulating developer particles on a brush, the use of magnetic particles in the form of a simulated brush, a layer of insulating developer particles across a sheet surface which is presented to the image bearing surface, and the like.

Generally, these various known developing systems employ particles which have been previously charged in one way or another, and which are then attracted to oppositely charged areas on the surface to be developed or are moved to this surface by forces which bear a direct relationship to the charges on the surface to be developed.

Now, in accordance with the present invention which employs relatively conductive particles on a relatively conductive base or developer dispenser, charges are induced to the developer particles, when developing charged areas, as controlled by the charges on the surface to be developed and in an amount which is directly proportional to the field strength. Because charges are induced in a proportional amount into the developer material the forces governing transfer of the developer particles to the surface bearing the charge pattern are directly proportional to the square of the field strength. Accordingly, development in accordance with this invention improves tonal rendition, increases the intensity of particle transfer from a given supply of powder, improves large charge area coverage and prevents unwanted particle deposition in background areas. This improved technique in development has been found particularly valuable for continuous tone development in the art of xerography, yet it may also be used for line copy image development, half-tone image development and the like.

It is accordingly an object of this invention to devise new methods of developing electrostatic charge patterns.

It is a further object of this invention to improve upon the art of xerography by devising new methods of developing xerographic images.

For a better understanding of this invention, as well as other objects and further features thereof, reference is had to the following detailed description thereof to be read in connection with the accompanying drawing, wherein:

FIG. 1 illustrates an embodiment of charge area image development in accordance with this invention;

FIG. 2 is an embodiment of uncharged area development according to this invention; and, FIG. 3 is yet another embodiment of this invention.

For a better understanding of this invention, reference is now had to FIG. 1 wherein development in accordance with this invention is illustrated. The various steps shown in FIG. 1 in actuality take place at substantially the same instant of time. However, they are described in terms of a sequence of happenings for the purpose of better understanding this invention.

In FIG. 1–A developer dispenser 20 is being positioned across and in contact with image bearing layer 11 of insulating material overlying conductive layer 10. The limitations as to the insulating qualities of image bearing layer 11 are controlled to a large extent by the speed of development, and generally image bearing layer 11 should be sufficiently insulating to retain the image charges at least until image development has taken place and preferably until the developing dispensing member 20 is removed out of contact. Preferably, therefore, image bearing layer 11 is of a material having a resistivity at least about as great as $10^{13}$ ohm-centimeters, but it may have a resistivity as low as about $10^{11}$ ohm-centimeters where layer 11 is rapidly processed. On or at the surface of image bearing layer 11 is a charge pattern 12 represented in this figure as positive electrostatic charges at the surface to be developed. Attracted negative charges 9 in conductive layer 10 act to neutralize charges 12. Negative charges 9 are attracted into position upon formation of image pattern 12 on the surface of layer 11, and if layer 9 were not present then similar negative balancing charges would exist at the back surface of layer 11. Although not essential to operation, it is preferred that conductor 10 be grounded, as shown, or otherwise connected into the electrical circuit. Positioned across the surface to be developed and in actual physical contact with the surface to be developed is developer dispenser 20. In this figure developer dispenser 20 is illustrated as spaced apart from image bearing layer 11. This has been done, however, only for the sake of clarity in discussing the operation of this invention. In reality physical contact exists between developer dispensing member 20 and the surface to be developed of image bearing layer 11.

Developer dispensing member 20 comprises a support layer 13 and a developer layer 15 and support layer 13 in this embodiment is connected through lead 16 to ground. For illustrative purposes developer layer 15 is shown as a single layer, but as is known this may comprise a reasonably thick multiple particle layer. Support layer 13 comprises a relatively conductive material when compared to image bearing layer 11; that is, developer support layer 13 should be at least two orders of magnitude more conductive or less insulating than image bearing member 11 and is preferably at least 3 orders of magnitude more conductive than image bearing layer 11. Also, it is believed that development in accordance with this invention is more effective when a more conductive layer is employed. In fact, best operation to date has resulted using conductive foils or metals having resistivities in the order of $10^{-4}$ ohm-centimeters as support layer 13.

Positioned across the surface of support layer 13 and facing the image bearing surface of image bearing layer 11 is a substantially continuous and substantially uniform layer of particulate developer material 15. This material, like support member 13, is at least 2 orders of magnitude more conductive or less resistive than image bearing layer 11, and is preferably at least 3 orders of magnitude more conductive. In addition, also this material may be a conductor in the usual sense such as conductive metals or the like.

Also, in order to insure uniformity in development across the surface being developed, the surface of support layer 13 should be uniformly loaded with developer material 15, and this is a simpler task when the surface itself is uniform. Thus, it may be a smooth surface or it may be a uniformly grained surface or the like. In practice, best results have been obtained using a smooth metallic surface.

Loading the surface of support layer 13 may be accomplished by directing a powder cloud of the developer material at the surface to be loaded. Many particles striking the surface will remain adhering due to Van der Waals forces and loading may be continued until a uniform and dense coating is obtained. Improved loading can be obtained if precautions are taken to electrostatically charge the particles prior to depositing them on the surface to be loaded, as through feeding at turbulent rates through fine tubes or the like. It has also been found valuable to bias the surface to be loaded when charged particles are used and preferably to a polarity opposite to that of the polarity of charge on the particles. One device which has been used for loading is shown in U.S. Patent 2,759,450. Support layer 13 to be loaded is placed in the device in the area intended for a plate, and this has been done both with and without an applied bias. Another technique used for loading is cascading cascade developer as used in xerography across the surface of support layer 13. Liquid loading systems have also been tried, but these generally have been less successful since occasionally a developer dispenser 20 loaded in such a manner will not readily release particulate material during development. The preferred technique of loading which has given best results to date involves powder cloud fed to support layer 13 while a bias is applied to support layer 13 which attracts charged particles of powder cloud for uniform deposition thereacross.

In FIG. 1–B developer dispensing member 20 comprising particle layer 15 on grounded support layer 13 is positioned in physical contact with image bearing layer 11 overlying conductive backing layer 9. Backing layer 9, as illustrated, is also grounded. Because of the close positioning of these various layers and because support layer 13 and particle layer 15 of developer dispensing member 20 are relatively conductive and are connected to a source of bias potential (ground), charges 18 which are opposite in polarity to the charges 12 of the image are induced into particle layer 15 in areas corresponding to charges 12 of image bearing layer 11. When this occurs some of the negatively induced charges 9 in the conductive backing 10 are released and dispersed in the conductor or flow to ground.

In connection with FIG. 1–B and the description of charge induction above, it is noted that although substantially all known xerographic developing systems are polarity sensitive, this is not the case in the present invention. Thus, although in FIG. 1–B charges 12 are illustrated as positive polarity charges, the same techniques as illustrated may be followed to develop negative polarity charges. There is no need to change the developer powder or to change the bias applied. If charges 12 were negative instead of positive, negative charges 18 illustrated as induced to particle layer 15 would be positive charges and compensating negative charges 9 in conductive backing 10 would be positive charges. This follows since in this invention we are dealing with conductive particles which are connected to a bias source, thus making possible attraction from the bias source charge having a proper polarity tending to neutralize the charges on the charge pattern bearing layer.

In FIG. 1–C separation of developer dispensing member 20 from image bearing layer 11 is illustrated. In this figure it is again to be realized that developer dispenser 20 is in actual physical contact with image bearing layer 11, and although it is presently believed that particles move to image bearing layer 11 prior to separation, as illustrated at the top portion of this figure, since in reality particle layer 15 is in physical contact with both support layer 13 and image bearing layer 11. It is not until developer dispenser 20 is separated from image bearing layer 11 that one can tell that image development has taken place; nor generally is the developed image useful until developer dispenser 20 has been removed from image bearing layer 11. As illustrated in this figure, the developer particles bearing induced charges 18 move to the surface of image bearing layer 11 from support layer 13. At this point, as illustrated in this figure, more of the negative induced charges present in backing member 10 are released into other areas of backing member 10 or to ground. There thus results following separation of developer dispenser 20 from image bearing layer 11, a developed image on the surface of image bearing layer 11 conforming to the charge pattern 12 being developed.

In FIG. 1–D there is shown an enlarged view for purposes of illustrating how the transferred developer remains adhering as a developed image to the image bearing member. Illustrated in this figure is a segment of image bearing layer 11 bearing charges 12 of the image pattern. Positioned against image bearing layer 11 is particle 15 carrying induced charges 18. Previous FIGURES 1–A, 1–B, and 1–C illustrate how charges 18 flow to developer particles 15 and how developer particles 15 transfer to image bearing layer 11. Induced charges 18 in conductive particle 15 move relatively freely. However, image bearing layer 11 is relatively insulating and, as is well known, charge will not readily flow between a conductor and an insulator. For this reason it is believed that induced charges 18 align themselves within particle 15 in position adjacent to charges 12 of the image pattern as illustrated. Electric fields of force are thus created between the opposite charges, and since in the usual case no flow takes place between these opposite charges, particle 15 will remain bound in position on image pattern bearing layer 11.

Referring now to FIG. 2, there is illustrated an embodiment for development of uncharged (rather than charged as in FIG. 1) areas of image bearing layer 11. As in FIG. 1, image bearing layer 11 overlies conductive backing 10, and conductive backing 10 is grounded. Also in FIG. 2 the image pattern on image layer 11 comprises positive polarity charges 12, and induced into conductive backing 10 are compensating negative charges 9. Although backing 10 is shown as attached to image layer 11, it can be a separate element, as implied in connection with FIG. 1, it may be omitted entirely. Preferably, it is attached as shown. Again, as in FIG. 1, developer dispenser 20 is positioned in intimate physical contact (although for illustrative clarity it is shown spaced apart) with the surface of image bearing layer 11. Also as in FIG. 1, particle layer 15 is positioned across support base 13. In this figure the ground connection of support base 13 has been replaced by a variable potentiometer 21 connected across battery 22, and in this embodiment a raised positive potential in respect to ground is applied to support base 13 of developer dispenser 20. Again, as in FIG. 1, support base 13 and particles 15 are relatively conductive. The potential applied to support base 13 should be about equal to the highest potential of the image pattern on image bearing layer 11. With such a potential applied, no field exists between charges 12 in image layer 11 and developer dispenser 20 and thus in areas of developer dispenser 20 corresponding to areas of charge 12 of image layer 11, there is no flow of induced charges to balance charges 12 of image layer 11, and there is no attraction of developer particles to image layer 11. However, in areas of developer dispenser 20 corresponding to areas of no charge 23 in image layer 11 a field does exist since in these areas particles 15 are raised to a positive potential; whereas areas of no charge 23 in image layer 11 are substantially at ground potential. Accordingly, in areas in developer dispenser 20 corresponding to areas of no charge in image layer 11, electrostatic fields of force exist between the surface of image bearing layer 11 and corresponding facing particles 15 of developer dispenser 20. This field causes additional charges to be induced into backing member 10 (see the upper portion of this figure) thus intensifying the forces causing transfer of the developer particles.

Since, as described in connection with FIG. 1, the mechanism of induction and particle transfer is substantially simultaneous rather than a step-by-step process, as illustrated in FIG. 1, the illustration of this figure includes developer dispensing member 20 both coming in (at the bottom) and being moved away (at the top) from image bearing layer 11. As shown in this figure, particles 15 carrying positive charges transfer to image bearing layer 11 in areas of no charge, thereby forming a developed image on the surface of image bearing member 11 conforming in configuration to the image pattern and including particles deposited in uncharged areas. This has at times been referred to in the art as reversal development, but is believed more accurately described in terms of uncharged area development, as has been done in connection with this invention.

Referring now to FIG. 3, an arrangement similar to FIG. 1 is shown including a sheet member 5 sandwiched between developer dispensing member 20 comprising support base 13 and particle layer 15 with support base 13 grounded through lead 16 and image bearing layer 11 bearing charges 12 of an image pattern overlying grounded conductive backing member 10 including induced charges 9. As shown, particles transfer to sheet 5 in areas of sheet 5 corresponding to charges 12 in image bearing layer 11. These particles carry induced negative charges 18. Sheet-like member 5 is characterized as sufficiently insulating to maintain a field therethrough. If this member is too conductive then it acts as an equipotential surface and prevents fields of force from operating on the particle layer 15 to induce charges into particles corresponding to areas to be developed, and thus particle movement for deposition on sheet-like member 5 does not take place. More specifically, sheet-like member 5 should have a resistivity upward of about $10^{10}$ ohm-centimeters and preferably in the range above $10^{13}$ ohm-centimeters and may comprise, for example, dried paper, insulating plastic films such as cellulose acetate or polyester available under the trade name Mylar, cellophane vinyl resins, other cellulosic resins or the like.

The embodiment illustrated in this figure is particularly valuable in connection with image formation on a sheet-like member for use as a final print. Transfer of the developed image is avoided when this system is employed, and at the same time particles are not deposited on the plate. Accordingly, cleaning steps generally required in the art of xerography are not needed.

In FIG. 3 there is illustrated charge area development, but as should be obvious, the arrangement of this figure may be used for development of uncharged areas and generally within the scope and disclosure of this invention.

In developing charged areas, as illustrated, for example, in FIG. 1, support base 13 may be grounded or may have applied thereto a slight bias potential. In developing a xerographic plate the uncharged areas are usually at a slightly raised potential, and it is preferred that this same slight potential be applied to support base 13 to avoid fields in the uncharged areas. Thus, and for example, if the image bearing layer in the discharged or uncharged areas has a potential of 10 to 15 volts, then a potential of the same polarity of about 10 to 15 volts should be applied to support layer 13. However, if developing a surface on which charge has been selectively deposited without any charge deposition in the uncharged areas, then preferably support base 13 is grounded. Further, in connection with FIG. 2, if it is desired to develop an image bearing member or layer bearing a negative electrostatic charge pattern, then a negative polarity potential is applied to support base 13 which is approximately equal to the highest level of potential on the image bearing layer to cause particle deposition in the uncharged areas.

Development has also been accomplished without applying a bias from a potential source to support layer 13. Instead this layer may be maintained electrically floating during the coming together, development and separation steps. In such an instance a bias or potential is applied in that support sheet 13, being conductive, assumes the average potential of the image bearing surface. In the usual case when developing a xerographic plate this is approximately 90% of the highest potential on the image bearing surface. This occurs since only a small part of the plate is usually discharged during light exposure leaving a large proportion of the plate at a raised potential. When the support layer 13 assumes a potential of about 90% of the highest potential on the surface being developed, good quality development results, and the image bearing layer is developed in uncharged areas. If only a small percentage of image layer 11 is charged, then support layer 13 assumes a low potential and development takes place in charged areas. It is preferred, however, that support layer 13 be biased at a proper level from a potential source during development, since when allowed to electrically float a sufficient potential difference exists between the image bearing layer and support layer 13 in areas not intended to be developed to cause some particle deposition in these areas. Thus, in developing while allowing support layer 13 to electrically float, some background is evident in the ultimate print.

As mentioned in this specification, image bearing layer 11 need not be in intimate contact with conductive backing member 10. What is necessary is freedom of charge migration at the rear surface of image layer 11 controlled by the fields of force present. This can be accomplished, for example, through the use of an A.C. corona generating source positioned at a distance behind image layer 11 and without a conductive backing. Operation in accordance with this invention is simplified and produces better quality images, however, when image bearing layer 11 is in actual physical and electrical contact with a conductive backing such as conductive backing 10.

The speed of development in accordance with this invention is greatly dependent on the conductivity of the materials being used for support base 13 and developer particles 15. When poor conductors are used sufficient time must elapse to allow induction of charge to take place into the particles, and when good conductors are used induction takes place rapidly and image development follows immediately or simultaneously.

The amount of particles which deposit are controlled to a large extent by the intensity of the charges of the pattern being developed. Charges induced to the developer particles remain in the particles and the particles which transfer remain bound in place against the image bearing surface. New particles deposit in an attempt to neutralize the electrostatic charges of the pattern being developed. In practice complete neutralization is not the usual case, but as has become known in the art, particles depositing to a point approaching neutralization are sufficient for good image definition and image density.

The developer particles which may be used in connection with this invention may comprise powdered irons and other powdered metals and the like, powdered carbons including graphite and lampblack and preferably charcoal. Generally, the particles should have a particle size less than about 20 microns and preferably the particles should be of an average particle size of about less than 5 microns. It is, of course, to be realized that the choice of particle and particle size will be dependent somewhat on the image being developed and the resolution desired. Thus, and for example, if one is attempting to develop continuous tone images it is preferred to use an average particle size of less than 5 microns and a maximum particle size of no more than about 20 microns. However, when developing line copy, the broader range stated is sufficient for good quality copy.

A particular benefit of development in accordance with this invention as compared, for example, to known techniques of development of electrostatic images, is that the developer particles fed to the surface to be developed are not bound by any susbtantial forces to the surface feeding the developer particles. Thus, in both FIG. 1 and FIG. 2 particles fed to the developing dispensers are held on these developing members by van der Waals forces. These forces, although sufficient to hold the particles on the developing dispensing members, are insignificant when compared, for example, to the electrostatic forces which must be overcome when employing such developing techniques as cascade development or magnetic development in which the particles are electrostatically bound to carriers. These forces are also insignificant when compared to magnetic development, for example, employing only magnetic particles which are magnetically bound to the magnet and are releasable because of electrostatic attraction to an electrostatic image. Similarly, these forces are insignificant when compared, for example, to the surface tension of a substantially continuous liquid film, and accordingly, the fields of force induced by the electric charge pattern being developed are substantially more effective in bringing about development when compared to known developing systems, since, in the developing system of this invention there is substantially no threshold to overcome before the particle moves for deposition purposes, whereas in substantially all known developing systems there is a threshold, whether it be magentic or electrostatic, which can be considered significant when compared to the operation of my invention, and which must be overcome before particle deposition takes place.

After a developed image is formed on the image bearing surface it may be used in accordance with known techniques such as transfer to a transfer base, viewing in place, photographing, projecting or the like.

While specific embodiments of the present invention have been described, as should be readily apparent, many variations exist, and it is not desired to be limited only to the embodiments described, but it is intended to cover the invention broadly within the spirit and scope of the appended claims.

What is claimed is:

1. The method of image development in xerography comprising loading uniformly a dispensing member having a conductive surface layer with uncharged conductive developer particles, said particles being loaded on said conductive surface layer, maintaining said particles in adherence with said conductive surface layer substantially only by Van der Waal's forces, positioning said dispensing member adjacent to and across an electrostatic image pattern bearing surface with said conductive particles in contact with said pattern bearing surface and said dispensing member, and removing said dispensing member from said electrostatic image pattern bearing surface to form a developed image.

2. The method of claim 1 in which the conductive particles comprise charcoal.

3. The method of developing a pattern of electrostatic charges on an insulating support surface comprising bringing conductive particles disposed on a conductive particle support member in the substantial absence of adherent force into physical contact with the charge pattern to be developed while the conductive particles are electrically connected to a potential of about ground through electrical connection to the particle support member, and removing the particle support member from said charge pattern forming a developed image on said support surface.

4. The method of developing uncharged areas of a pattern of electrostatic charges on an insulating support surface comprising bringing conductive particles adherent substantailly by Van der Waal's forces on a conductive particle support member into physical contact with the charge pattern to be developed while the conductive particles are electrically connected to a potential of the same polarity as the charges of the image pattern and equal to about the highest potential on the surface to be developed through electrical connection to the particle support member, and removing the particle support member from said charge pattern forming a developed image on said support surface.

5. The method of developing a pattern of electrostatic charges on a charge supporting surface comprising positioning uncharged conductive particles on a conductive dispensing base, maintaining said conductive particles on said dispensing base by substantially Van der Waal's forces, bringing said dispensing base to the support surface of the pattern of electrostatic charges with said conductive particles between said dispensing base and said support surface, and removing said dispensing base from said support surface.

6. The method of developing an image on a sheet-like member of relatively insulating material comprising positioning the sheet-like member between an assembly including a conductive support layer bearing with no more adherence than Van der Waal's forces a substantially uniform layer of conductive developer particles and an image bearing layer, said conductive particles being in contact with one surface of said sheet-like member and said image bearing layer being in contact with the other surface of said sheet-like member, applying to said conductive layer supporting said conductive particles a bias forming a potential source, and removing said conductive layer bearing conductive developer particles from said sheet-like member forming on said sheet-like member a developed image.

7. The method of developing electrostatic latent images comprising disposing a substantially uniform layer of conductive particles on a conductive surface layer of a dispensing member, maintaining said particles adherent to said surface layer substantially by Van der Waals forces, electrically biasing said particles by connection through said surface layer to a potential source and positioning said dispensing member across and in contact with an electrostatic latent image to be developed so that said particles while electrically baised are brought in contact with said electrostatic latent image, and removing said dispensing member from said electrostatic latent image to form a developed image.

8. The method of claim 7 in which the bias is substantially ground and in which the conductive particles are uncharged.

9. The method of claim 7 in which the bias applied is of the same polarity as the charge pattern to be developed and is substantially equal to the highest potential across the charge pattern bearing surface.

10. The method of claim 7 in which the surface of said conductive surface layer is a smooth metallic surface.

11. The method of claim 7 in which said conductive surface layer is regularly and uniformly grained.

References Cited by the Examiner

UNITED STATES PATENTS

| | | | |
|---|---|---|---|
| 2,297,691 | 10/42 | Carlson | 117—17.5 X |
| 2,811,465 | 10/57 | Greig | 117—17.5 |
| 2,832,511 | 4/58 | Stockdale et al. | 117—17.5 X |
| 2,859,128 | 11/58 | Matthews et al. | 117—17.5 |
| 2,880,699 | 4/59 | Hayford | 118—637 |
| 2,890,968 | 6/59 | Giaimo | 117—17.5 |
| 2,895,847 | 7/59 | Mayo | 117—17.5 |
| 2,899,331 | 8/59 | Hayford | 117—17.5 |
| 2,976,144 | 3/61 | Rose | 117—17.5 X |

WILLIAM D. MARTIN, *Primary Examiner.*

RICHARD D. NEVIUS, *Examiner.*